United States Patent
Wang et al.

(10) Patent No.: US 9,966,891 B2
(45) Date of Patent: May 8, 2018

(54) SYSTEM AND METHOD FOR CONTROLLING SPEED OF ELECTRIC MOTOR

(71) Applicant: Mitsubishi Electric Research Laboratories, Inc., Cambridge, MA (US)

(72) Inventors: Yebin Wang, Acton, MA (US); Lei Zhou, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 91 days.

(21) Appl. No.: 15/071,460

(22) Filed: Mar. 16, 2016

(65) Prior Publication Data

US 2017/0272020 A1   Sep. 21, 2017

(51) Int. Cl.
H02P 3/18       (2006.01)
H02P 23/14      (2006.01)

(52) U.S. Cl.
CPC ................... *H02P 23/14* (2013.01)

(58) Field of Classification Search
CPC ........ H02P 23/14; H02P 21/13; H02P 21/141; H02P 21/26; H02P 21/18; H02P 21/14
USPC ........................................................ 318/729
See application file for complete search history.

(56) References Cited

U.S. PATENT DOCUMENTS

| | | | |
|---|---|---|---|
| 5,717,305 A * | 2/1998 | Seibel | H02P 21/34 318/432 |
| 8,203,298 B2 * | 6/2012 | Lu | H02P 23/14 318/461 |
| 8,674,647 B2 | 3/2014 | Iwaji et al. | |
| 8,760,098 B2 | 6/2014 | Qin | |
| 2003/0015988 A1 | 1/2003 | Giuseppe et al. | |
| 2013/0231891 A1 | 9/2013 | Long et al. | |
| 2015/0326155 A1 * | 11/2015 | Mohammed | H02P 6/12 318/400.03 |
| 2016/0226414 A1 * | 8/2016 | Wang | H02P 21/18 |
| 2017/0201198 A1 * | 7/2017 | Wang | H02P 21/0039 |

FOREIGN PATENT DOCUMENTS

EP    1635448 A1    3/2006

OTHER PUBLICATIONS

Atkinson et al. "Observers for Induction Motor State and Parameter." IEEE Transactions on Industry Applications, vol. 27. No. 6, Nov./Dec. 1991. pp. 1119-1127.

(Continued)

*Primary Examiner* — Eduardo Colon Santana
*Assistant Examiner* — Gabriel Agared
(74) *Attorney, Agent, or Firm* — Gene Vinokur; James McAleenan; Hironori Tsukamoto

(57) ABSTRACT

An electric motor is controlled using a feedback signal that includes an error between the measured current and the estimated current determined using the measured current, the measured voltage, and a model of the motor. A feedback gain is determined as an error function of a feedback signal and a speed of the motor is estimated using a product of the feedback gain and the feedback signal. The voltage of the motor is determined using a difference between the estimated speed of the motor and a reference speed of the motor and the motor us controlled using the determined voltage.

13 Claims, 12 Drawing Sheets

(56) References Cited

OTHER PUBLICATIONS

Schauder., "Adaptive Speed Identification for Vector Control of Induction Motors without Rotational Transducers." IEEE Transactions on Industry Applications, vol. 28, No. 5, Sep./Oct. 1992. pp. 1054-1061.

Kubota et al. "DSP-Based Speed Adaptive Flux Observer of Induction Motor." IEEE Transactions on Industry Applications, vol. 29, No. 2, Mar./Apr. 1993. pp. 344-348.

Kubota et al. "Speed Sensorless Field Oriented Control of Induction Machines using Flux Observer." G-7803-1328-3/94503.00, 1994 IEEE. pp. 1611-1615.

Ohyama et al. "Comparative Analysis of Experimental Performance and Stability of Sensorless Induction Motor Drives." IEEE Transactions on Industrial Electronics, vol. 53, No. 1 Feb. 2006. pp. 178-186.

Hilairet et al. "Speed and rotor flux estimation of induction machines using a two-stage extended Kalman filter." Automatica 45 (2009) 1819-1827.

\* cited by examiner

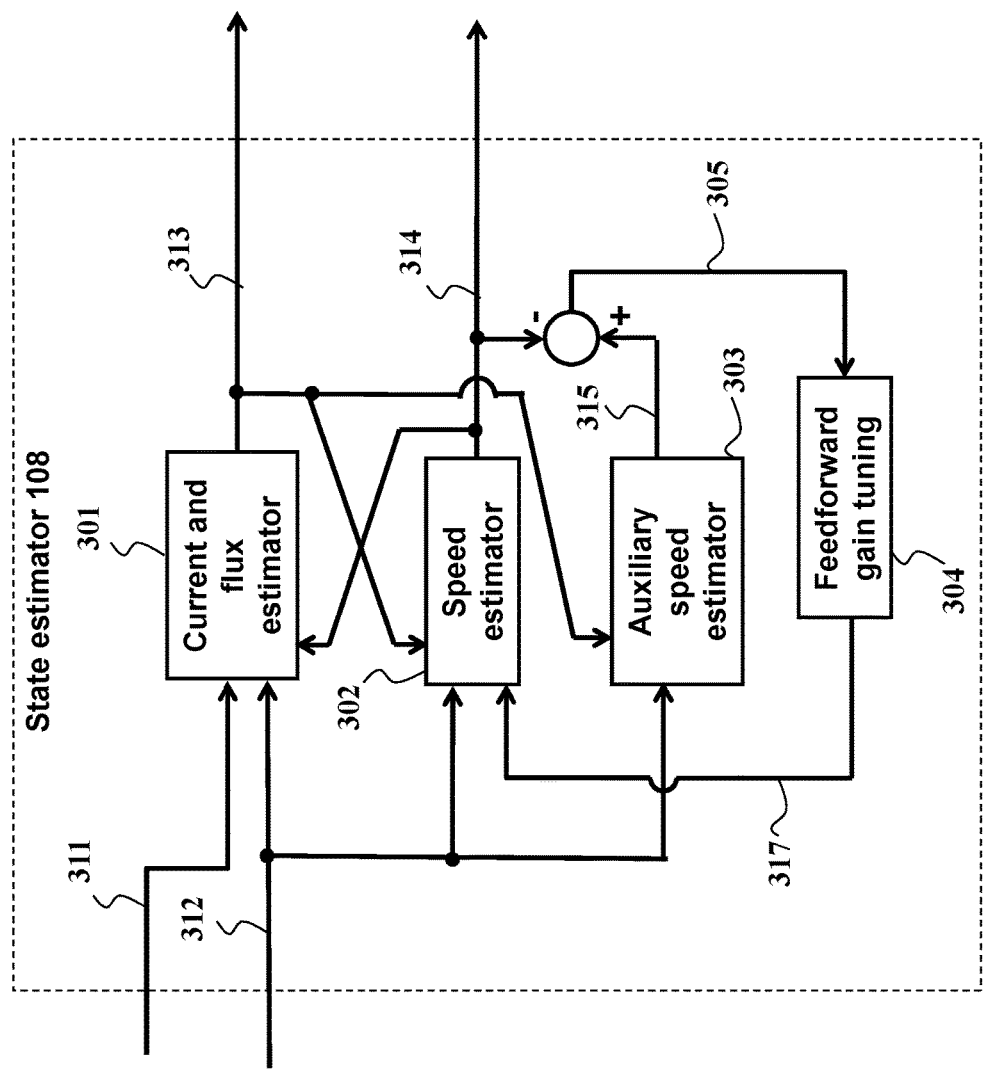
FIG. 3A *Induction motor state estimator*

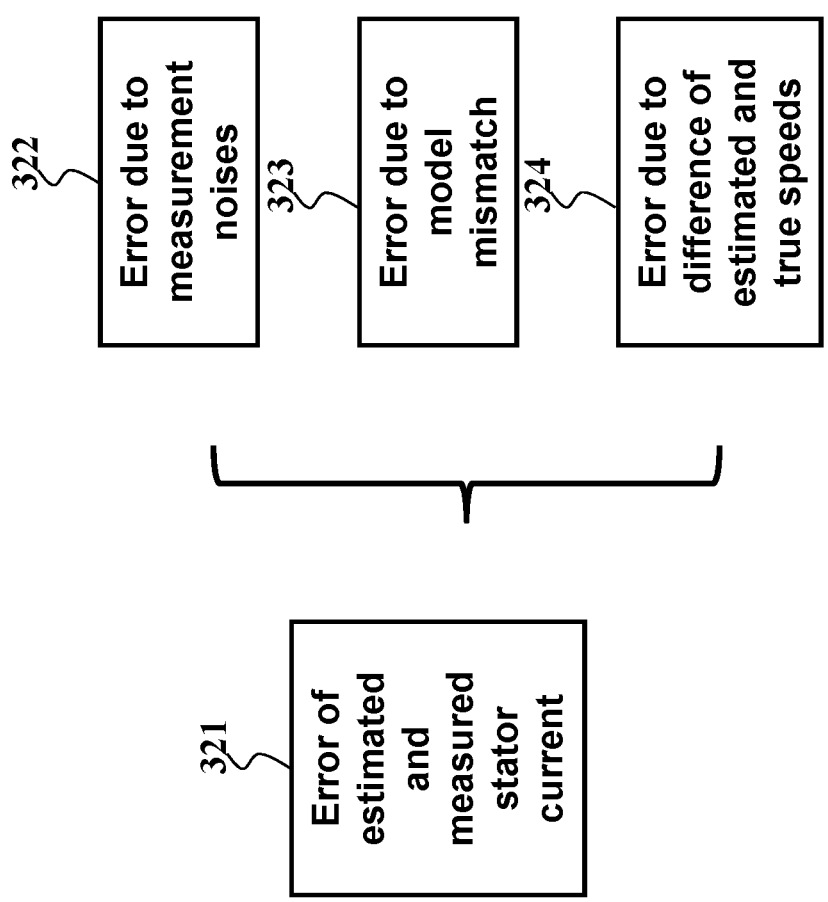
FIG. 3B *Induction motor state estimator*

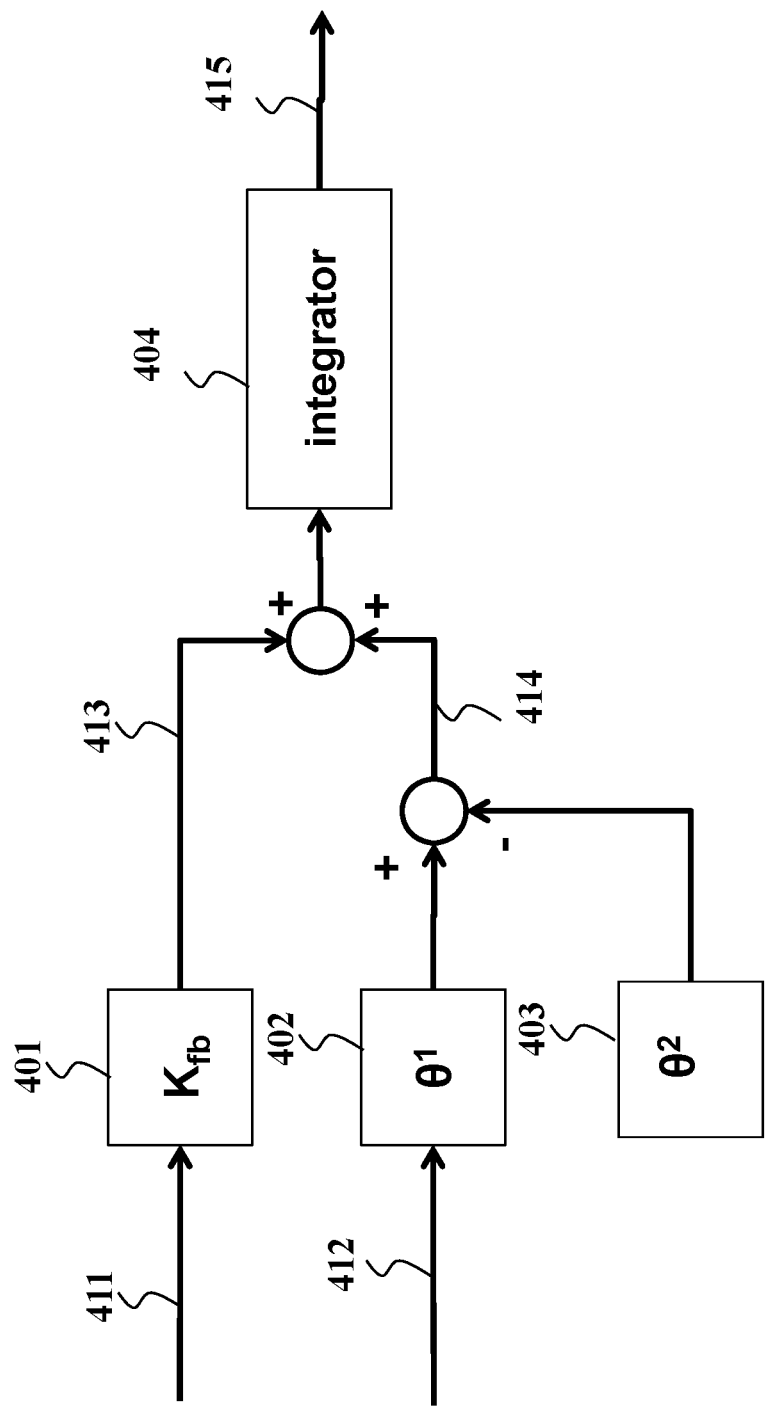
FIG. 4 *Speed estimation method*

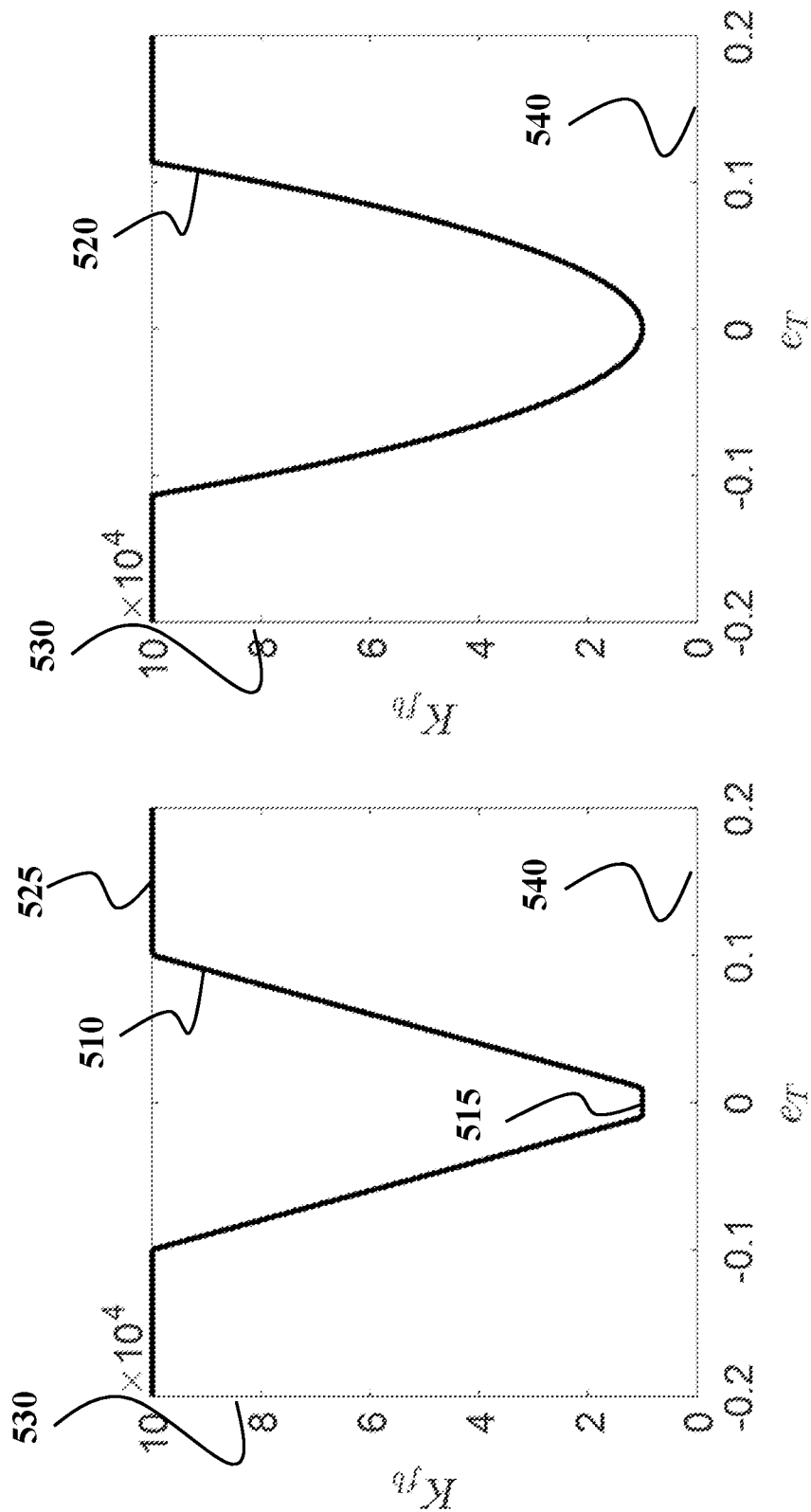

SYSTEM AND METHOD FOR CONTROLLING SPEED OF ELECTRIC MOTOR

FIELD OF THE INVENTION

This invention relates generally to controlling electric motors, and more particularly to a method and system for controlling the speed of the motor without using a sensor for measuring the speed or the position of the motor.

BACKGROUND OF THE INVENTION

Electric motors, particularly induction motors with variable speed, are widely used due to low maintenance cost and acceptable performance. However, the control of induction motors is challenging due to highly coupled and nonlinear dynamics. Vector control, also called field-oriented control (FOC), is a variable-frequency drive (VFD) control method where the stator currents of a three-phase AC electric motor are identified as two orthogonal components that can be visualized with a space vector. One component defines the magnetic flux of the motor, the other the torque or speed. The control system of the drive calculates from the flux and speed or torque references given by a high level controller the corresponding current component references. For example, proportional-integral (PI) controllers can be used to keep the measured current components at their reference values.

Speed sensorless control of the electric motors avoids measuring the speed of the motor. Such a control can also be referred as a speed sensorless control implemented by a speed sensorless motor drive, i.e., control system that does not use sensor to measure speed or position of the rotor of the motor. Speed sensorless motor drives are desirable due to the elimination of motor speed or position sensors, the lower cost, and the improved reliability of the resultant system. For example, conventional speed sensorless control technologies include a voltage model-based direct integration, an adaptive observer method, and an extended Kalman filter method.

However, the speed sensorless motor drives can fail to control the motor effectively. Specifically, a number of different speed sensorless motor drives suffer from performance degradation resulting from removing the encoder (the sensor to measure the position of the rotor) from the control loop, i.e., a position sensor from which the rotor speed can be quickly obtained. For example, the current speed sensorless control can fail to accurately and rapidly track a fast-changing speed reference trajectory of the electric motor. To that end, the application of the speed sensorless control technologies is limited to fields requiring low or medium performance of the motor. Accordingly, there is a need to improve the performance of the speed sensorless control of the electric motors.

SUMMARY OF THE INVENTION

It is an object of some embodiments of the invention to provide a system and a method for determining a speed of an electrical motor, e.g., an angular speed of a rotor of an induction motor. It is another object of some embodiment of the invention to estimate the speed of the motor without using any sensors for measuring speed and/or position of the rotor, while maintaining an accuracy of the estimation. It is another object of some embodiments of the invention to control the motor based on the estimated speed, e.g., to reduce a difference between the estimated speed of the motor and a reference speed of the motor.

Some embodiments of the invention estimate the speed of the motor based on an error between the measured current of the motor and the current estimated using a model of the model. The error between the measured and the estimated currents can result from a number of different factors. For example, such an error can result from one or combination of noises of the measurement of the current, inaccuracy in the model of the motor used for estimating the current, and differences between actual speed of the motor and estimated speed of the motor used in the model of the motor. Some embodiments of the invention are based on understanding that in different modes of operation of the motor, different factors play a dominant role in forming that error.

For example, during a steady state of the operation of the motor, the difference between the actual speed of the motor and the estimated speed of the motor is typically reduced, so the error between the measured and the estimated currents is predominately formed by the errors in the model and in the measurements. Conversely, during a transient state of the operation of the motor, the difference between the actual speed of the motor and the estimated speed of the motor play a predominant role in forming the error between the measured current and the estimated current.

Some embodiments of the invention are based on the understanding that an abovementioned difference needs to be considered in estimating the speed of the motor. For example, when the difference between the actual speed of the motor and the estimated speed of the motor play a predominant role in forming the error between the measured and the estimated currents, such a difference is desirable and needs to be aggressively exploited to quickly estimate and control the speed of the motor. Conversely, when the differences in the model and in the measurements play a predominant role in forming the error between the measured current and the estimated current, such differences are undesirable and can lead to a jitter of the estimated and true speeds of the motor. In those situations, the reaction of the speed estimator of the motor to the error between the measured and estimated currents needs to be reduced.

Some embodiments of the invention are based on a realization that a value of a feedback gain used for the estimating the speed of the motor can be varied in dependence on the desirability of the error between the measured and estimated currents. For example, when the error is desirable, the feedback gain can be increased to emphasize its desirability in the reaction of the speed estimation and control. Conversely, when the error is undesirable, the feedback gain can be decrease to deemphasize its desirability in the reaction of the speed estimation and control. To that end, some embodiments of the invention are using feedback gain that can have different values, as contrasted with the constant feedback gains.

Some embodiments of the invention are based on another realization that during the transient state, the difference between the actual speed and the estimated speed, typically leads to large amplitude of the error between the estimated and measured current. On the other hand, during the steady state operation, the error between the estimated and measured current is due to measurement noises and model inaccuracies and has relatively small amplitude. Accordingly, some embodiments of the invention determine a feedback gain as a function of a feedback signal that includes an error between the measured current and the estimated current. For example, such a function can increase the value of the feedback gain in response to an increase of a value of the amplitude of the feedback signal and can decrease the value of the feedback gain when the value of the amplitude of the feedback signal decreases.

Additionally or alternatively, some embodiments of the invention include a feedforward term in the speed estimator to more accurately represent the model of the motor. Some embodiments of the invention are based on understanding that the feedforward term can improve convergence of the speed estimation to the true speed of the motor, but if the feedforward gains are incorrectly tuned, the accuracy of the estimation of the speed of the motor using the feedforward term can be worse than accuracy of the estimation of the speed of the motor without using the feedforward term. To that end, some embodiments determine the feedforward gain by reducing a difference between the speed of the motor estimated with the feedforward term and the speed of the motor estimated without the feedforward term.

Accordingly, one embodiment of the invention discloses a method for controlling an electric motor. The method includes measuring a current and a voltage of the motor; determining an estimation of a current of the motor using the measured current, the measured voltage, and a model of the motor; determining a feedback gain as an error function of a feedback signal, wherein the feedback signal includes an error between the measured current and the estimated current; estimating a speed of the motor using a product of the feedback gain and the feedback signal; determining a voltage of the motor using a difference between the estimated speed of the motor and a reference speed of the motor; and controlling the motor using the determined voltage. At least some steps of the method are determined using a processor.

Another embodiment discloses a system including an electric motor to move a mass; at least one sensor to measure a current and a voltage of the motor; and a control system to control the motor. The control system includes a processor and a non-transitory computer readable storage medium embodied thereon a program executable by the processor for performing a method of the control, the method including determining an estimation of a current of the motor using the measured current, the measured voltage, and a model of the motor; determining a feedback gain as an error function of a feedback signal, wherein the feedback signal includes an error between the measured current and the estimated current; estimating a speed of the motor using a product of the feedback gain and the feedback signal; determining a voltage of the motor using a difference between the estimated speed of the motor and a reference speed of the motor; and controlling the motor using the determined voltage.

Yet another embodiment discloses a non-transitory computer readable storage medium embodied thereon a program executable by a processor for performing a method, the method including determining an estimation of a current of the motor using a measured current, a measured voltage, and a model of the motor; determining a feedback gain as an error function of a feedback signal, wherein the feedback signal includes an error between the measured current and the estimated current; estimating a speed of the motor using a product of the feedback gain and the feedback signal; determining a voltage of the motor using a difference between the estimated speed of the motor and a reference speed of the motor; and controlling the motor using the determined voltage.

BRIEF DESCRIPTION OF THE DRAWINGS

FIG. 3A is a block diagram of a state estimator of the field-oriented control system in FIG. 1A according to some embodiments of the invention;

FIG. 3B is a schematic of different factors in forming an error between the measured and the estimated current used by different embodiments of the invention;

FIG. 4 is a block diagram of a speed estimator according to one embodiment of the invention;

FIGS. 5A, 5B and 5C are examples of the error function used for determining the feedback gain by different embodiments of the invention;

DETAILED DESCRIPTION OF THE PREFERRED EMBODIMENTS

Figure 1A:
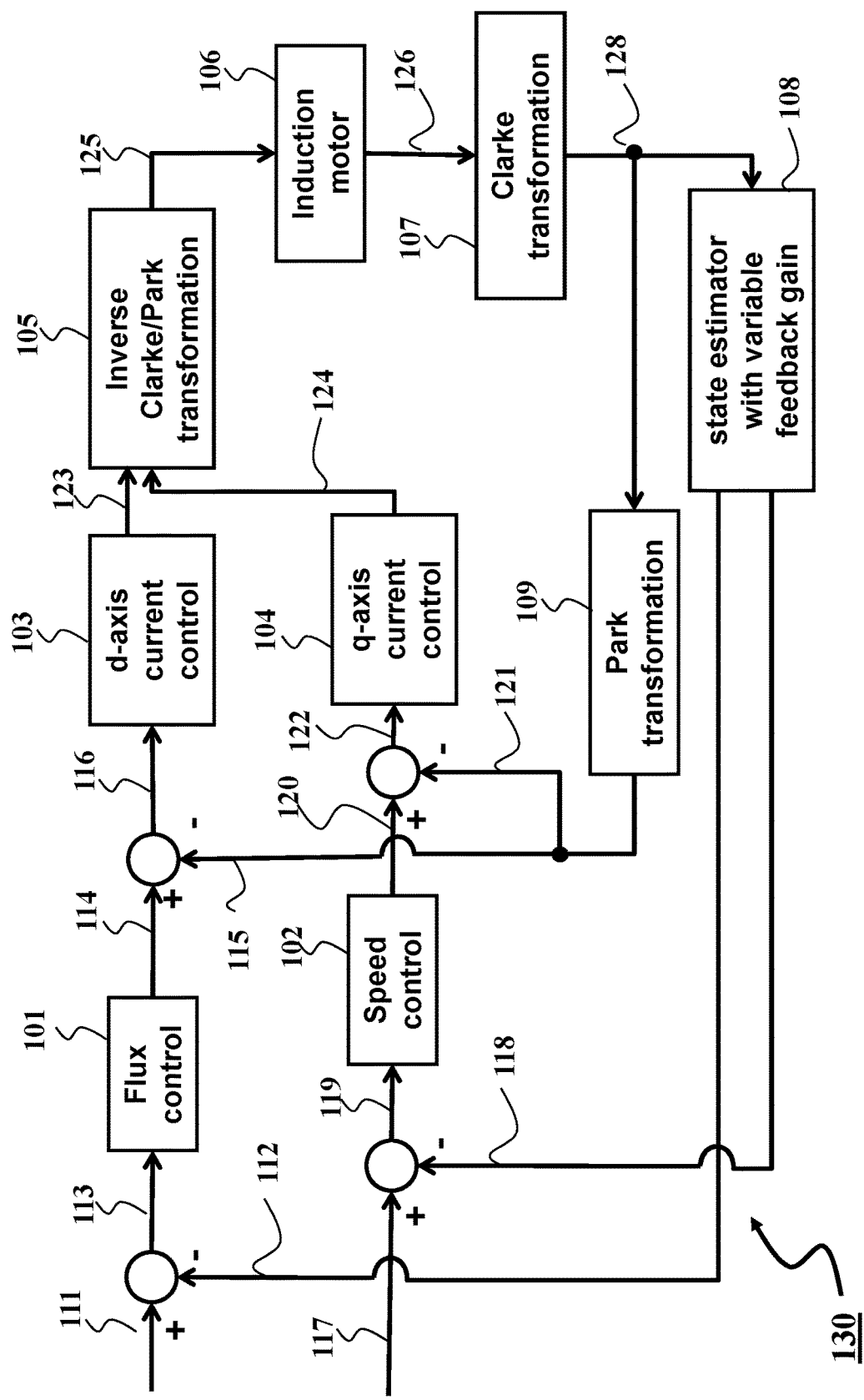
FIG. 1A is a block diagram of a system to control an electric motor using variable feedforward gain according to some embodiments of the invention.

FIG. 1A shows a block diagram of a system to control an electric motor according to some embodiments of the invention. In the example of FIG. 1A, the control is a sensorless field oriented control of an induction motor 106. However, other types of the control are within the scope of different embodiments. At least some components of the system can be implemented using one or several processors operatively connected to the motor 106. For example, at least some components of the system of FIG. 1A can be implemented as a non-transitory computer readable medium embodied thereon a program executable by a processor 130 for performing methods of different components. For example, the program can be organized in a number of software modules for executing different functions of the control system.

A signal 111 is an amplitude reference of the rotor flux, a signal 112 is its estimate outputted from a state estimator 108, a signal 113 represents a difference between signals 111 and 112. A flux control block 101 determines a d-axis stator current reference value, denoted by a signal 114. A signal 115 denotes the measured stator current in d-axis. A difference signal 116 between signals 115 and 114 is used by a d-axis current control block 103 to determine a reference stator voltage in d-axis, which is part of a signal 123.

Similarly, a signal 117 denotes a desired rotor speed reference of the induction motor, and a signal 118 denotes an estimated rotor speed produced by an induction motor state estimator block 108. A speed difference signal 119 between signals 117 and 118 is fed into a speed control block 102 to determine a reference stator current in q-axis, which is depicted by signal 120. A stator current in q-axis, denoted by 121, is compared to the reference stator current in q-axis 120 to produce a difference signal 122. The q-axis current control block 104 determines desired stator voltage signal in q-axis, denoted by 124.

A block 105 conducts inverse Park/Clarke transformation to convert the desired stator voltages signals in d- and q-axis into desired well-known three-phase voltages, and produces three-phase voltages, denoted as by 125, to drive the induction motor 106. The three-phase terminal voltages and the winding currents of the induction motor, denoted by 126, are measured and transformed to two-phase signal 128 by a Clarke transformation block 107. A Park transformation block 129 transforms the signal 128 into d- and q-axis to produce the current feedback signals 115 and 121. The state estimator 108 uses the transformed signal 128 to estimate the flux amplitude signal 112 and a rotor speed signal 118, as feedback signals.

Some embodiments of the invention are based on a realization that a value of a feedback gain used for the estimating the speed of the motor can be varied in dependence on the desirability of the error between the measured and estimated currents. For example, when the error is desirable, the feedback gain can be increased to emphasize its desirability in the reaction of the speed estimation and control. Conversely, when the error is undesirable, the feedback gain can be decrease to deemphasize its desirability in the reaction of the speed estimation and control. To that end, some embodiments of the invention are using feedback gain that can have different values, as contrasted with the constant feedback gains. To that end, the state estimator 108 uses different values of the feedback gain.

Some embodiments of the invention estimate the speed of the motor based on an error between the measured current of the motor and the current estimated using a model of the model. The error between the measured and the estimated currents can result from a number of different factors. For example, such an error can result from one or combination of noises of the measurement of the current, inaccuracy in the model of the motor used for estimating the current, and differences between actual speed of the motor and estimated speed of the motor used in the model of the motor. Some embodiments of the invention are based on understanding that in different modes of operation of the motor, different factors play a dominant role in forming that error.

For example, during a steady state of the operation of the motor, the differences between the actual speed of the motor and the estimated speed of the motor is typically reduced, so the error between the measured and the estimated currents is predominately formed by the errors in the model and in the measurements. Conversely, during a transient state of the operation of the motor, the difference between the actual speed of the motor and the estimated speed of the motor play a predominant role in forming the error between the measured current and the estimated current.

Some embodiments of the invention are based on the understanding that an abovementioned difference needs to be considered in estimating the speed of the motor. For example, when the difference between the actual speed of the motor and the estimated speed of the motor play a predominant role in forming the error between the measured and the estimated currents, such a difference is desirable and needs to be aggressively exploited to quickly estimate and control the speed of the motor. Conversely, when the differences in the model and in the measurements play a predominant role in forming the error between the measured current and the estimated current, such differences are undesirable and can lead to a jitter of the estimated and true speeds of the motor. In those situations, the reaction of the speed estimator of the motor to the error between the measured and estimated currents needs to be reduced.

Some embodiments of the invention are based on another realization that during the transient state, the difference between the actual speed and the estimated speed, typically leads to large amplitude of the error between the estimated and measured current. On the other hand, during the steady state operation, the error between the estimated and measured current is due to measurement noises and model inaccuracies and has relatively small amplitude. Accordingly, some embodiments of the invention determine a feedback gain as a function of a feedback signal that includes an error between the measured current and the estimated current. For example, such a function can increase the value of the feedback gain when the values of the amplitude of the feedback signal increase and can decrease the value of the feedback gain when the values of the amplitude of the feedback signal decrease.

Figure 1B:
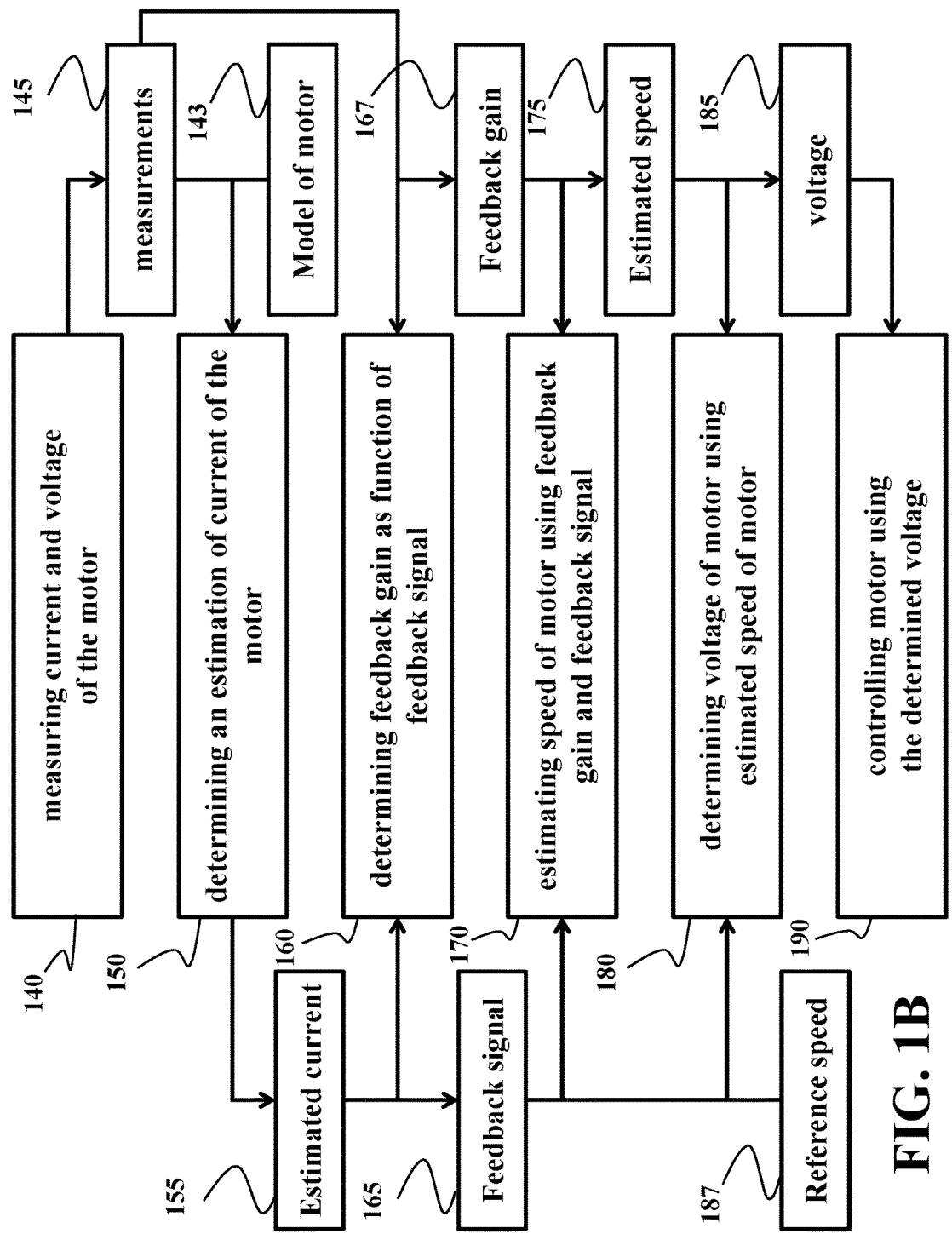
FIG. 1B is a block diagram of a method for controlling an electric motor according to one embodiment of the invention.

FIG. 1B shows a block diagram of a method for controlling an electric motor according to one embodiment of the invention. The method can be implemented using a processor, such as the processor 130. An example of the electric motor is an induction motor 106.

The embodiment measures 140 a current and a voltage of the motor. For example, the measurements 145 of the voltage and/or current can be acquired from various sensors arranged at the motor. For example, the measurements 145 can form at least part of the signal 126 in FIG. 1B. The embodiment determines 150 an estimation of a current 155 of the motor using the measured current and the measured voltage 145, an estimate of the speed of the motor, and a model of the motor 143. For example, the current 155 can be estimated by the state estimator 108.

The embodiment determines 160 a feedback signal 165 including an error between the measured current 145 and the estimated current 155 and determines 160 a feedback gain 167 as a function of the feedback signal 165. In this disclosure, such a function is referred as an error function. The error function varies the values of the feedback gain for different modes of operation of the motor, such that the feedback gain has different values for at least two different values of the error.

The embodiment estimates 170 a speed 175 of the motor using a product of the feedback gain 167 and the feedback signal 165, and determines 180 a voltage 185 of the motor using a difference between the estimated speed 175 of the motor and a reference speed 187 of the motor that motor needs to track. For example, the speed 175 can be estimated using a state estimator with variable feedback gain block 108 of FIG. 1A. For example, the voltage 185 can be determined using current control blocks 103 and/or 104 of FIG. 1A. Next, the embodiment control 190 the motor using the determined voltage 185. For example, the voltage 185 can be includes into the signal 125 that is an input to the motor 106 in FIG. 1A.

Notations

To facilitate the disclosure, the following notations are used herein. Letting $\zeta$ denote a variable of the real induction motor, $\bar{\zeta}$ is denoted as a measured variable, $\hat{\zeta}$ as an estimate of the variable, $\zeta^*$ as the reference of the variable, $\tilde{\zeta}=\bar{\zeta}-\hat{\zeta}$ as the estimation error, and $e_\zeta=\zeta^*-\zeta$ as the tracking error.

Figure 2:
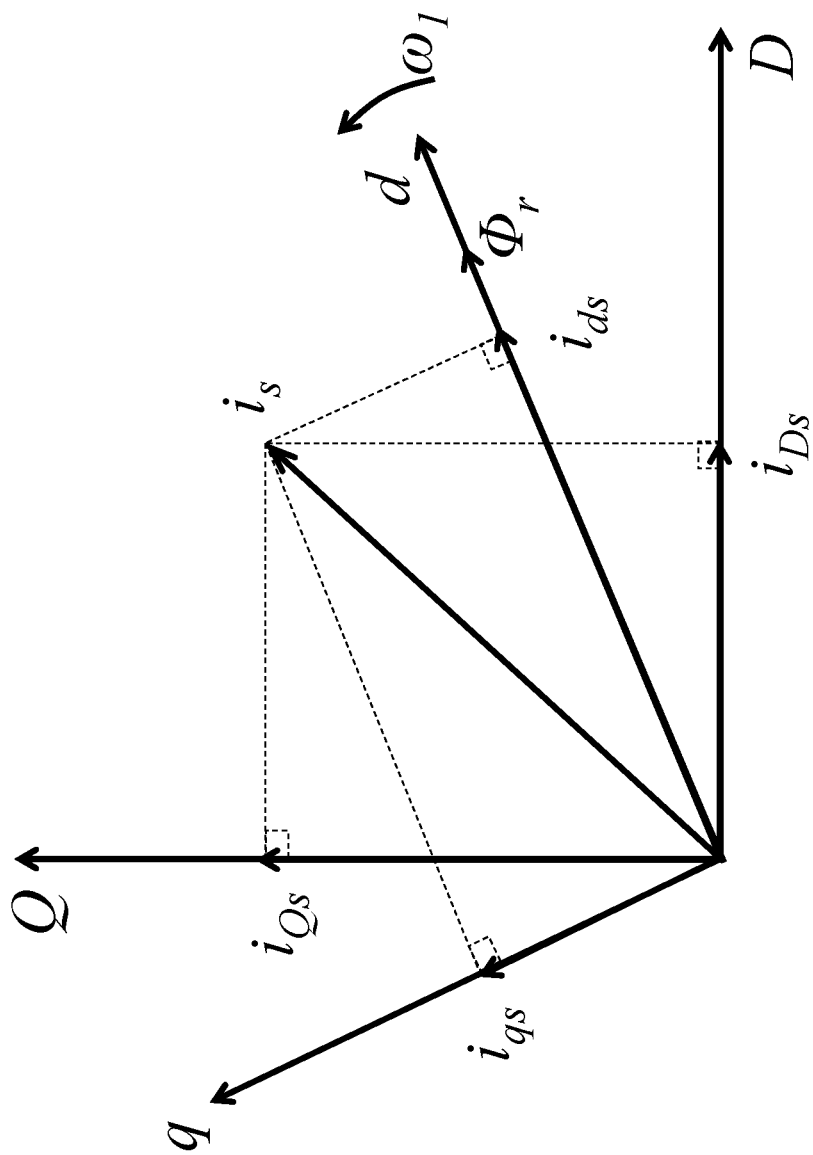
FIG. 2 is a schematic of coordinate notations used by various embodiments.

FIG. 2 shows the coordinate notation used by various embodiments. As is shown in FIG. 2, coordinate D-Q represents the stator-fixed frame, and coordinate d-q represents a rotational frame with a rotational speed of $\omega_1$. One rotational d-q frame is the rotor flux-oriented frame, which has a rotational speed $\omega_1$ equals the angular speed of the rotor flux vector, and with its d-axis aligned with the rotor flux vector $\Phi_r$. In the rest of this disclosure, unless mentioned otherwise, the frame d-q represents the rotor flux-oriented frame. Some notations are given in Table 1.

TABLE 1

| Notation | Description |
| --- | --- |
| $i_{ds}, i_{qs}$ | stator currents in d- and q-axis |
| $i_{Ds}, i_{Qs}$ | stator currents in D- and Q-axis |
| $\Phi_{dr}, \Phi_{qr}$ | rotor fluxes in d- and q-axis |
| $\Phi_{Dr}, \Phi_{Qr}$ | rotor fluxes in D- and Q-axis |
| $u_{ds}, u_{qs}$ | stator voltages in d- and q-axis |
| $u_{Ds}, u_{Qs}$ | stator voltages in D- and Q-axis |
| $\omega$ | rotor angular speed |
| $\omega_1$ | angular speed of a rotating frame |
| $\Phi_r^*$ | rotor flux amplitude reference |
| $\omega^*$ | rotor angular speed reference |
| $i_{ds}^*, i_{qs}^*$ | references of stator currents in d- and q-axis |
| $T_l$ | load torque |
| $J$ | inertia |
| $L_s, L_m, L_r$ | stator, mutual, and rotor inductances |
| $R_s, R_r$ | stator and rotor resistances |
| $\sigma$ | $\dfrac{L_s L_r - L_m^2}{L_r}$ |
| $\alpha$ | $R_r/L_r$ |
| $\beta$ | $L_m/(\sigma L_r)$ |
| $\gamma$ | $R_s/\sigma + \alpha \beta L_m$ |
| $\mu$ | $3L_m/(2JL_r)$ |

Model of Electric Motor

The Clarke transformation is a mathematical transformation employed to transform quantities in a three-phase into a two-phase system, and represent quantities in a space vector form, which significantly simplifies the analysis of three-phase systems. In this disclosure, Clarke transformation is limited to the case which transforms quantities in three-phase such as three-phase stator voltages into a space vector in the fixed frame (or equivalently the D-Q frame). Similarly, the Park transformation, or known as d-q transformation, projects the quantities in a fixed frame (the D-Q frame) onto a rotating two-phase reference frame. Clarke/Park transformation and its inverse are well-known for those skilled in the art, and their rigorous description is omitted.

Some embodiments of the invention use a model of an induction motor. However, such a model can be easily modified for different types of the electric motors. With the Clarke transformations, physical quantities of the induction motor such as three-phase currents, voltages, and fluxes are represented by space vector quantities in a fixed frame. With the Park transformation, space vector quantities in a fixed frame of the induction motor are represented by another set of space vector quantities in a rotating frame. For those skilled in the art, a general induction motor model in a rotating frame d-q with an angular speed $\omega_1$ is given by $$\dot{i}_{ds} = -\gamma i_{ds} + \omega_1 i_{qs} + \beta(\alpha \Phi_{dr} + \omega \Phi_{qr}) + \frac{u_{ds}}{\sigma} \quad (1)$$

$$\dot{i}_{qs} = -\gamma i_{qs} - \omega_1 i_{ds} + \beta(\alpha \Phi_{qr} - \omega \Phi_{dr}) + \frac{u_{qs}}{\sigma}$$

$$\dot{\Phi}_{dr} = -\alpha \Phi_{dr} + (\omega_1 - \omega)\Phi_{qr} + \alpha L_m i_{ds},$$

$$\dot{\Phi}_{qr} = -\alpha \Phi_{qr} - (\omega_1 - \omega)\Phi_{dr} + \alpha L_m i_{qs}$$

$$\dot{\omega} = \mu(\Phi_{dr} i_{qs} - \Phi_{qr} i_{ds}) - \frac{T_l}{J}$$

$$y = [i_{ds} \ i_{qs}]^T,$$

where y represents measured signals. It is clear that only stator currents are measured. If $\omega_1 = 0$, the induction motor model (1) is reduced to the following model in the fixed (stationary) D-Q frame $$\dot{i}_{Ds} = -\gamma i_{Ds} + \beta(\alpha \Phi_{Dr} + \omega \Phi_{Qr}) + \frac{u_{Ds}}{\sigma} \quad (2)$$

$$\dot{i}_{Qs} = -\gamma i_{Qs} + \beta(\alpha \Phi_{Qr} - \omega \Phi_{Dr}) + \frac{u_{Qs}}{\sigma}$$

$$\dot{\Phi}_{Dr} = -\alpha \Phi_{Dr} - \omega \Phi_{Qr} + \alpha L_m i_{Ds}$$

$$\dot{\Phi}_{Qr} = -\alpha \Phi_{Qr} + \omega \Phi_{Dr} + \alpha L_m i_{Qs}$$

$$\dot{\omega} = \mu(\Phi_{Dr} i_{Qs} - \Phi_{Qr} i_{Ds}) - \frac{T_l}{J}$$

$$y = [i_{Ds} \ i_{Qs}]^T.$$

The design of state estimators, which estimate states denoted by $x = (i_{ds}, i_{qs}, \Phi_{dr}, \Phi_{qr}, \omega)^T$ or $x = (i_{Ds}, i_{Qs}, \Phi_{Dr}, \Phi_{Qr}, \omega)^T$ in the rotating or fixed frames, respectively, are usually based on the models (1) or (2).

Induction Motor State Estimator Design

FIG. 3A shows a block diagram of the state estimator 108 of the field-oriented control system in FIG. 1A according to some embodiments of the invention. The signal 311 denotes measured stator winding terminal voltages, i.e., $u_{Ds}$ and $u_{Qs}$, of the induction motor in the stationary frame, and the signal 312 denotes measured stator winding currents, i.e., $i_{Ds}$ and $i_{Qs}$, of the induction motor in the stationary frame. The output signal 313 is the estimated stator currents and rotor flux, denoted by $\hat{i}_{Ds}$, $\hat{i}_{Qs}$ and $\hat{\Phi}_{Dr}$, $\hat{\Phi}_{Qr}$, respectively. The output signal 314 is the estimated rotor speed $\hat{\omega}$.

The measured stator voltage and current signals 311 and 312, together with the estimated speed signal 314 from a previous iteration, are input to a current and rotor flux estimator 301 configured to estimate the current and rotor flux of the motor. By separating out the rotor speed equation from the induction motor model (2) and regarding the rotor speed ω as a time-varying parameter, the nonlinear induction motor model in (2) is reduced to a linear system as $$\begin{bmatrix} \dot{i}_{Ds} \\ \dot{i}_{Qs} \\ \dot{\Phi}_{Dr} \\ \dot{\Phi}_{Qr} \end{bmatrix} = \begin{bmatrix} -\gamma & 0 & \alpha\beta & \beta\omega \\ 0 & -\gamma & -\beta\omega & \alpha\beta \\ \alpha L_m & 0 & -\alpha & -\omega \\ 0 & \alpha L_m & \omega & -\alpha \end{bmatrix} \begin{bmatrix} i_{Ds} \\ i_{Qs} \\ \Phi_{Dr} \\ \Phi_{Qr} \end{bmatrix} + \begin{bmatrix} \frac{1}{\sigma} & 0 \\ 0 & \frac{1}{\sigma} \\ 0 & 0 \\ 0 & 0 \end{bmatrix} \begin{bmatrix} u_{Ds} \\ u_{Qs} \end{bmatrix}, \quad (3)$$

$$y = [i_{Ds} \ i_{Qs}]^T.$$

In different embodiments, the current and flux estimator 301 for the linear induction motor system (3) uses different estimators designed for the linear systems, such as Luenberger and/or Kalman filter. For example, one embodiment uses a Luenberger solution to determines 150 the current of the motor according to $$\begin{bmatrix} \dot{\hat{i}}_{Ds} \\ \dot{\hat{i}}_{Qs} \\ \dot{\hat{\Phi}}_{Dr} \\ \dot{\hat{\Phi}}_{Qr} \end{bmatrix} = \begin{bmatrix} -\gamma & 0 & \alpha\beta & \beta\hat{\omega} \\ 0 & -\gamma & -\beta\hat{\omega} & \alpha\beta \\ \alpha L_m & 0 & -\alpha & -\hat{\omega} \\ 0 & \alpha L_m & \hat{\omega} & -\alpha \end{bmatrix} \begin{bmatrix} \hat{i}_{Ds} \\ \hat{i}_{Qs} \\ \hat{\Phi}_{Dr} \\ \hat{\Phi}_{Qr} \end{bmatrix} + \begin{bmatrix} \frac{1}{\sigma} & 0 \\ 0 & \frac{1}{\sigma} \\ 0 & 0 \\ 0 & 0 \end{bmatrix} \begin{bmatrix} u_{Ds} \\ u_{Qs} \end{bmatrix} + \quad (4)$$

-continued $$\hat{y} = [\hat{\imath}_{Ds} \; \hat{\imath}_{Qs}]^T,$$

$$G\begin{bmatrix} i_{Ds} - \hat{\imath}_{Ds} \\ i_{Qs} - \hat{\imath}_{Qs} \end{bmatrix},$$

where G is a gain matrix having 4 rows and 2 columns.

FIG. 3B shows a schematic of different factors in forming an error 321 between the measured and the estimated current used by different embodiments of the invention. As shown in FIG. 3B, the error 321 is represented by $\tilde{\imath}_{Ds} = i_{Ds} - \hat{\imath}_{Ds}$ and $\tilde{\imath}_{Qs} = i_{Qs} - \hat{\imath}_{Qs}$ and includes one or combination of three components, i.e., an error current 322 due to measurement noises, an error current 323 due to model mismatches between the induction motor model used in the current and flux estimator design and the true induction motor model, and an error current 324 due to differences of the estimated speed 314 $\hat{\omega}$ and the true speed $\omega$. Some embodiments of the invention are based on recognition that the components 322 and 323 need to be removed, while the dominance of the component 324 needs to be preserved. Some embodiments of the invention achieve such a balancing of the components of the error 321 by varying the values of the feedback gain used for estimation of the speed of the motor.

FIG. 4 shows a block diagram of a speed estimator 302 according to one embodiment of the invention. In this embodiment, the speed estimator 302 uses the measured current signal 312 and/or the estimated flux signal 313 to estimate the rotor speed signal 314 using a combination of feedforward and feedback terms. In FIG. 4, a block 401 represents a feedback gain $K_{fb}$, and two blocks 402 and 403 represent two feedforward gains $\theta^1$ and $\theta^2$. A signal 411 represents feedback signal $e_T$ that includes an error between the measured current and the estimated current. In one embodiment, the feedback signal can be determined as $\tilde{\imath}_{Ds}\hat{\Phi}_{Qr} - \tilde{\imath}_{Qs}\hat{\Phi}Dr$. In alternative embodiment, the feedback signal 411 can be determined as $\tilde{\imath}_{qs}$ in the rotor flux-oriented frame. Because the relationship $$\tilde{\imath}_{Ds}\hat{\Phi}_{Qr} - \tilde{\imath}_{Qs}\hat{\Phi}_{Dr} = \tilde{\imath}_{qs}\hat{\Phi}_{dr}$$

holds, and the d-axis rotor flux $\hat{\Phi}_{dr}$ is usually regulated to its reference $\Phi_r^*$, the q-axis current error signal $\tilde{\imath}_{qs}$ also includes the information for speed estimation. A signal 413 denotes the feedback term in the speed estimator, which is achieved by amplifying the signal 411 by the feedback gain 401.

Additionally or alternatively, some embodiments of the invention include a feedforward term in the speed estimator to more accurately represent the model of the motor. Some embodiments of the invention are based on understanding that the feedforward term can improve convergence of the speed estimation to the true speed of the motor. A feedforward signal 412 represents a state dependent part of the feedforward term, which can be calculated as $i_{Qs}\hat{\Phi}_{Dr} - i_{Ds}\hat{\Phi}_{Qr}$. A signal 414 represents the feedforward term in the speed estimator, which is calculated using the feedforward gains 402 and/or 403 and the feedforward 412.

Some embodiments tune feedforward gains 402 and/or 403 online or offline. Some embodiments of the invention are based on understanding that if the feedforward gains are incorrectly tuned, the accuracy of the estimation of the speed of the motor using the feedforward term can be worse than accuracy of the estimation of the speed of the motor without using the feedforward term. To that end, some embodiments determine the feedforward gain reducing a difference between the speed of the motor estimated with the feedforward term and the speed of the motor estimated without the feedforward term.

One embodiment of the invention estimates the speed of the motor using a sum of a feedback term and a feedforward term. The feedback term includes the product of the feedback gain and the feedback signal, and the feedforward term includes a product of a feedforward gain and a feedforward signal, in which the feedforward signal includes at least part of a state of the motor. For example, the embodiment estimates the speed $\hat{\omega}$ 415 by integrating 404 the sum of the feedback term 413 and the feedforward term 414. For example, in one embodiment configured for real-time embedded controllers, implements the estimation in a discrete-time form as $$\omega_k = \omega_{k-1} + dt(\theta_k^1(i_{Qs}\hat{\Phi}_{Dr} - i_{Ds}\hat{\Phi}_{Qr}) - \theta_k^2 + K_{fb}(\tilde{\imath}_{Ds}\hat{\Phi}_{Qr} - \tilde{\imath}_{Qs}\hat{\Phi}_{Dr})), \quad (5)$$

where $\hat{\omega}_k$ is the estimated rotor speed at the sample instant k; dt is the sample time; $\theta_k^1$ and $\theta_k^2$ are the feedforward gains; $K_{fb}$ is the feedback gain.

Nonlinear Feedback Gain Estimator

Some embodiments of the invention determines the feedback gain nonlinearly to address the trade-off between the requirement of using high feedback gain during transient for bandwidth improvement, and the requirement of using small feedback gain during steady state operation for mitigating measurement noises and model mismatches. Some embodiments of the invention determine the feedback term as the error function of the feedback signal $e_T$ that includes the error between the measured and the estimated currents. Some embodiments of the invention are based on recognition that an amplitude of the feedback signal can indicate the dominance of specific factors in forming the error between the measured and the estimated currents.

For example, when the current and flux estimator of the induction motor is convergent, i.e., the motor is in steady state, the feedback signal $e_T$ demonstrates a periodic oscillation slightly above and below its mean value, and the fundamental frequency of this periodic oscillation is the rotational frequency of the induction motor. This speed ripple is because of the parametric model error, un-modeled motor dynamics, and inherent motor torque ripple. During the steady operation, the embodiments reduce the values of the feedback gain to avoid magnifying the undesirable error resulting in large harmonic oscillation in the estimated speed.

On the other hand, during the transient state of the motor, e.g., when the motor is accelerating or decelerating, the feedback signal $e_T$ presents a relatively large magnitude, and converges to its steady state value after the transient. During the transient state, a large feedback gain is desired to increase the speed estimation bandwidth.

FIG. 5A and FIG. 5B show example of the error function 510 and 520 for determining the feedback gain 530 based on the values of the feedback signal 540 used by different embodiments of the invention. Based on the aforesaid observations, the feedback gain in the speed estimation $K_{fb}$ is designed as a function of the feedback term $e_T$, which has a smaller amplitude when $e_T$ is smaller than its typical magnitude, and has a larger amplitude when $e_T$ is around its typical value of during transient.

To that end, as can be seen from FIG. 5A and FIG. 5B, the error function 510 or 520 increases the value of the feedback gain when the value of an amplitude of the feedback signal increases and decreases the value of the feedback gain when the value of the amplitude of the feedback signal decreases.

In some embodiments, in the error function 510 or 520, the value of the feedback gain is bounded between a minimal value 515 and a maximal value 525 of the feedback gain.

Figure 5C:
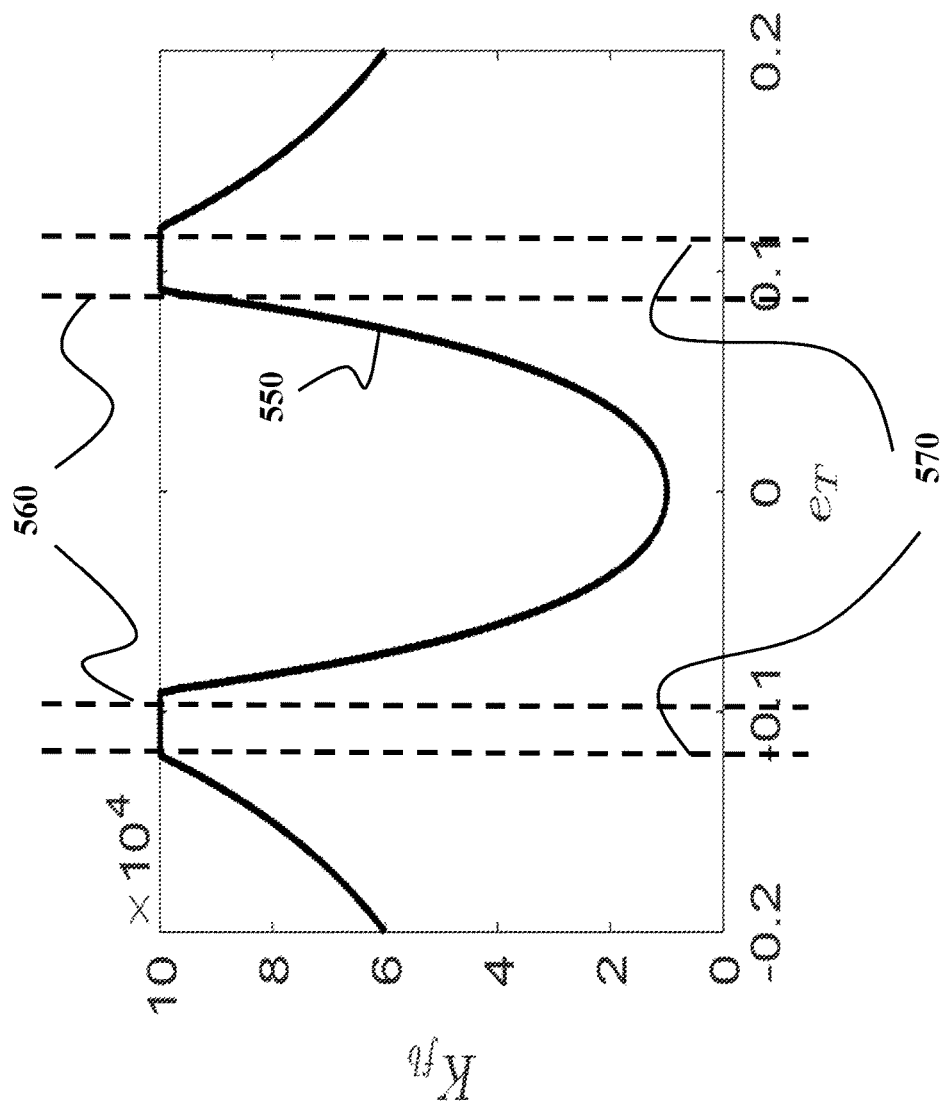

FIG. 5C shows another example of the error function 550 according to another embodiment of the invention. This embodiment is based on understanding that when the larger value of the feedback signal $e_T$ can also indicate a divergence or inaccuracy in the speed estimation. Under this circumstance, the embodiment decreases the feedback gain to prevent further divergence of the speed estimation. To that end, in one embodiment, the error function increases the value of the feedback gain when the value of an amplitude of the feedback signal increases until a first threshold 560. However, the error function decreases the value of the feedback gain when the value of the amplitude of the feedback signal increases above a second threshold 570. In different embodiments, the second threshold is greater or equals the first threshold.

Feedforward Speed Estimator

One embodiment of the invention estimates the speed of the motor using a feedforward term that includes a product of a feedforward gain and a feedforward signal. In some implementations, the feedforward signal includes at least part of a state of the motor. The objective of the feedforward term is to ensure that the speed estimation matches dynamic of the motor, such as the dynamics of Equation (2). For example, in accordance with the Equation (2), the feedforward gains are $\theta_k^1 = \mu$;

$$\theta_k^2 = \frac{T_l}{J}$$

to facilitate tracking of the rotor speed under the condition that the flux estimation has converged. However in practical applications, parameters of the induction motor model, such as the rotor inertia and load torque, are often not exactly known. To that end, some embodiments of the invention use an iterative tuning speed estimator to tune the feedforward gains 402 and 403 automatically.

In one embodiment, the tuning of the feedforward gain relies on the optimization of a certain objective function, which should represent the performance of the speed estimator. Define a vector of the feedforward gains $\theta_k = [\theta_k^1, \theta_k^2]^T$. If the motor speed can be directly measured, the objective function could be selected as $$V(\theta_k) = \tilde{\omega}_k^T \tilde{\omega}_k,$$

where $\tilde{\omega}_k = \omega_k - \hat{\omega}_k$.

In the speed sensorless circumstance, the motor speed is not measured and thus its approximation is required to be a ground truth to tune the feedforward gains. In one embodiment, an auxiliary speed estimator 303 referenced in FIG. 3 is used to provide the auxiliary speed signal used as the ground truth to tune the feedforward gains. As is shown in FIG. 3, an auxiliary speed estimator 303 is running in parallel with the speed estimator 302 to produce the auxiliary speed signal 315. Some embodiments of the invention, determine the feedforward gains such that the speed estimated using those gains approaches the axillary speed signal 315.

Figure 6:
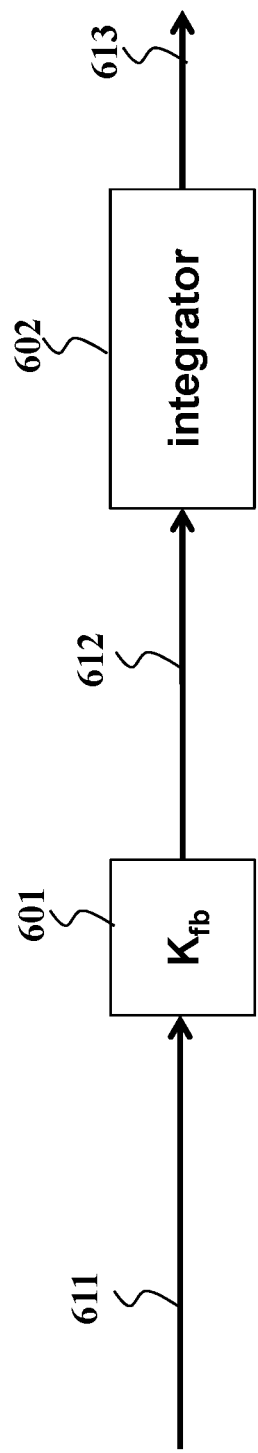
FIG. 6 is a block diagram of the auxiliary speed estimator according to one embodiment of the invention.

FIG. 6 shows a block diagram of the auxiliary speed estimator 303 according to one embodiment of the invention. A signal 611 represents the feedback signal $e_T$, which can be the same as the signal 411 in FIG. 4. A block 601 represents the nonlinear feedback gain $K_{fb}$, which can be the same value as the feedback gain 401 in FIG. 4. A signal 612 denotes the speed estimation signal, which is calculated by amplifying the signal 611 by the gain 601. A block 602 denotes an integration operation that outputs the reference speed signal 613 used for tuning the feedforward gains. In this embodiment, the axillary speed signal 613 $\hat{\omega}_a$ can be calculated by $$\hat{\omega}_a = \int K_{fb}(\tilde{i}_{Ds}\hat{\Phi}_{Qr} - \tilde{i}_{Qs}\hat{\Phi}_{Dr})dt.$$

Figure 7:
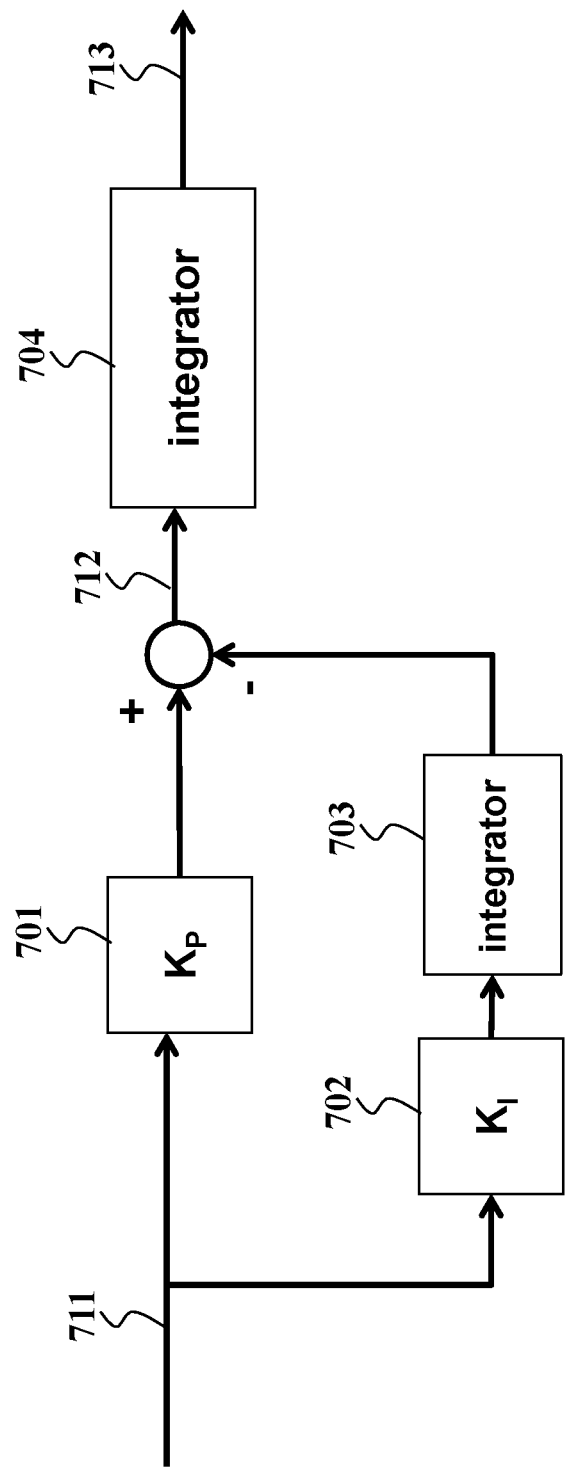
FIG. 7 is a block diagram of the auxiliary speed estimator according to another embodiment of the invention.

FIG. 7 shows a block diagram of the auxiliary speed estimator 303 according to another embodiment of the invention. In FIG. 7, a signal 711 represents the feedback signal $e_T$, which can be the same as the signal 411 in FIG. 4. Two blocks 701 and 702 are the proportional and integral gains of the speed auxiliary estimator, and a block 703 denotes the integration operation in the estimation. A signal 712 denotes the sum of the proportional and integral estimation terms. A block 704 denotes the integration operation, and a signal 713 denotes the ground truth speed signal. In this embodiment, the reference speed signal $\hat{\omega}_a$ can be calculated by $$\hat{\omega}_a = K_P(\tilde{i}_{Ds}\hat{\Phi}_{Qr} - \tilde{i}_{Qs}\hat{\Phi}_{Dr}) + K_1 \int (\tilde{i}_{Ds}\hat{\Phi}_{Qr} - \tilde{i}_{Qs}\hat{\Phi}_{Dr})dt,$$

where $K_P$ and $K_1$ are positive gains.

Using the axillary speed signal $\hat{\omega}_a$ in the tuning of the feedforward term, the corresponding cost function can be written as $$V(\theta_k) = (\hat{\omega}_a - \hat{\omega})^T(\hat{\omega}_a - \hat{\omega}).$$

Without loss of generality, it is assumed that no constraints are present on the selection of the feedforward estimation gain, i.e., the optimization problem defined before is unconstrained. Since the difference between the two estimated speed $\hat{\omega}_a - \hat{\omega}$ is a linear function of the feedforward estimation gain $\theta_k$, the objective function is convex, which implies that the global optimal is achievable. The value of the feedforward gains 317 in FIG. 3 can be updated iteratively using the gradient based search method in the block 304.

Figure 8:
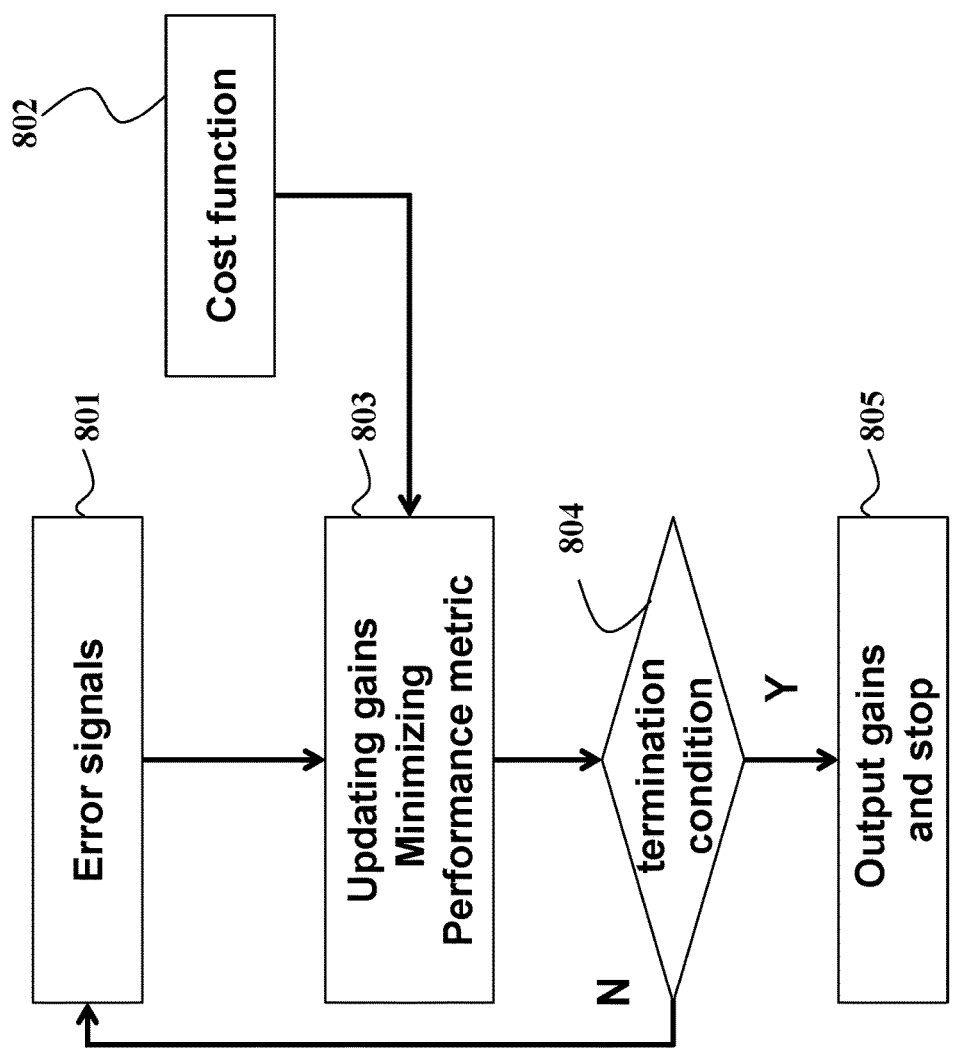
FIG. 8 is a block diagram of a method for determining a feed forward gain according to one embodiment of the invention.

FIG. 8 shows a block diagram of a method for determining a feedforward gain according to one embodiment of the invention. The embodiment can be implemented in a feedforward gain tuning block 304.

In FIG. 8, a speed estimation error signal 802 can be defined as $\hat{\omega}_a - \hat{\omega}$ and a cost function 802 can be defined as $V = (\hat{\omega}_a - \hat{\omega})^T(\hat{\omega}_a - \hat{\omega})$. The embodiments optimizes 803 the feedforward gain iteratively, such that the speed of the motor estimated using the feedforward gain minimizes the cost function. For example, the optimization 803 can use uses a gradient based search that updates the feedforward gain iteratively until a termination condition is met. For example, at each iteration, the feedforward gain can be updated according to $$\theta_{k+1} = \theta_k - \alpha_k R_k^{-1} \frac{\partial V(\theta_k)}{\partial \theta_k},$$

where $\theta_k$ is the feedforward gain vector at the k-th iteration, $\alpha_k$ is the step size of gradient search, $R_k$ is a matrix to modify the search direction, and $\partial V/\partial \theta_k$ is the gradient of the cost function with respect to the feedforward gain evaluated at the present value of $\theta_k$.

The gradient based search that updates the feedforward gain iteratively until 804 a termination condition is met. For example, the termination condition can be selected as a certain number of iterations or when the gradient is smaller than a threshold.

In some embodiments, the tuned feedforward gain 317 in FIG. 3 is input into the speed estimator 302 for the rotor speed estimation in the next control iteration. The auto-tuning method can be used for on-line feedforward gain tuning, which means the state estimation and the feedforward gain tuning are working concurrently, as is shown in FIG. 3.

Figure 9:
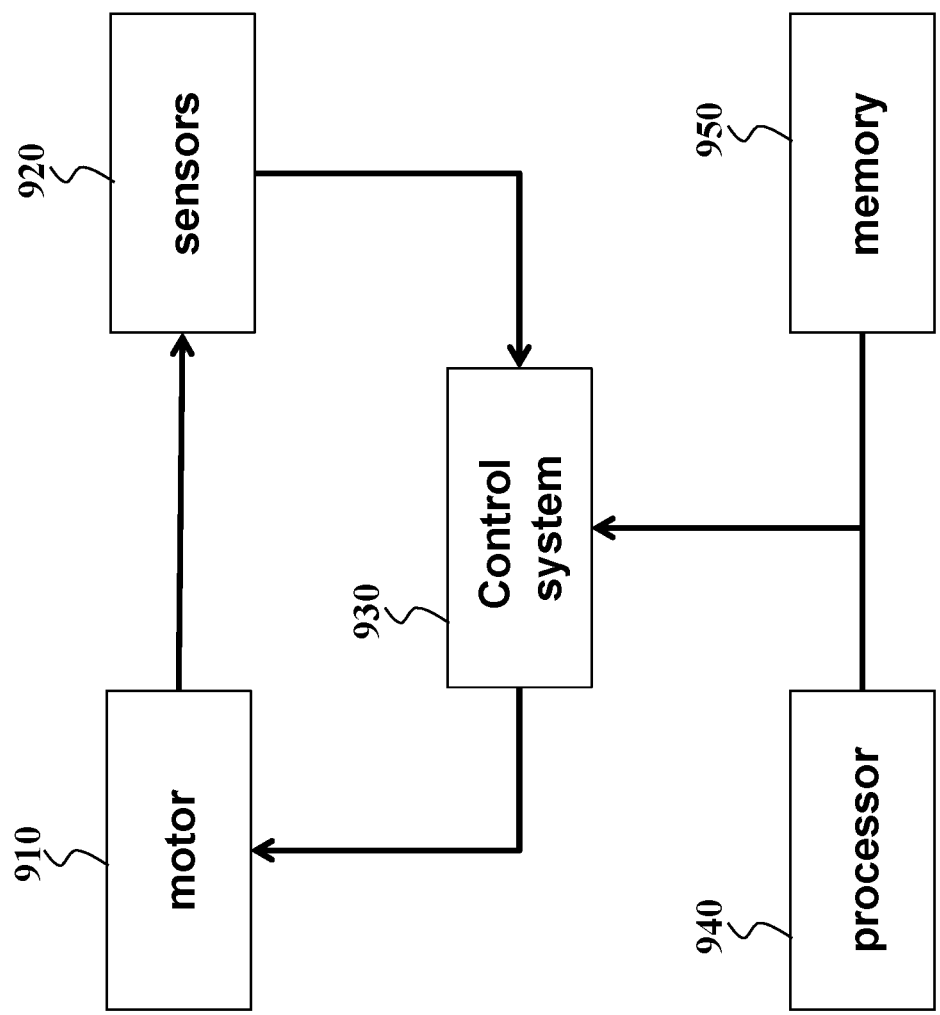
FIG. 9 is a block diagram of a system according to one embodiment of the invention.

FIG. 9 shows a block diagram of a system according to one embodiment of the invention. The system includes an electric motor 910 to move a mass and at least one sensor 920 to measure a current and a voltage of the motor. For example, the electric motor can be an induction motor including a stator and a rotor. Examples of the sensor include sensors measuring winding currents and terminal voltages of the motor.

The system of FIG. 9 also includes a control system 930 to control the motor. The control system includes a processor 940 and a memory 950, e.g., a non-transitory computer readable storage medium embodied thereon a program executable by the processor 940 for performing a method of the control described above.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for controlling an electric motor, comprising:
measuring a current and a voltage of the motor;
determining an estimation of a current of the motor using the measured current, the measured voltage, and a model of the motor;
determining a feedback gain as an error function of a feedback signal, wherein the feedback signal includes an error between the measured current and the estimated current, wherein the error function increases a value of the feedback gain when a value of an amplitude of the feedback signal increases until a first threshold, and wherein the error function decreases the value of the feedback gain when the value of the amplitude of the feedback signal increases above a second threshold, wherein the second threshold is greater or equal the first threshold;
estimating a speed of the motor using a product of the feedback gain and the feedback signal;
determining a voltage of the motor using a difference between the estimated speed of the motor and a reference speed of the motor; and
controlling the motor using the determined voltage, wherein at least some steps of the method are determined using a processor.

2. The method of claim 1, wherein the error function increases a value of the feedback gain when a value of an amplitude of the feedback signal increases, and wherein the error function decreases the value of the feedback gain when the value of the amplitude of the feedback signal decreases.

3. The method of claim 1, wherein the value of the feedback gain is bounded between a minimal value and a maximal value of the feedback gain.

4. The method of claim 1, wherein the estimating comprises:
determining the estimated speed of the motor using a sum of a feedback term and a feedforward term, wherein the feedback term includes the product of the feedback gain and the feedback signal, and wherein the feedforward term includes a product of a feedforward gain and a feedforward signal, wherein the feedforward signal includes at least part of a state of the motor.

5. The method of claim 4, further comprising:
determining the feedforward gain reducing a difference between the speed of the motor estimated with the feedforward term and the speed of the motor estimated without the feedforward term.

6. The method of claim 4, further comprising:
determining an axillary speed signal without using the feedforward term;
optimizing the feedforward gain iteratively, such that the speed of the motor estimated using the feedforward gain approaches the ground truth speed signal.

7. The method of claim 6, wherein the optimizing uses a gradient based search that updates the feedforward gain iteratively to reduce a cost function until a termination condition is met.

8. The method of claim 1, wherein the motor is an induction motor including a stator and a rotor, and wherein the speed is an angular speed of the rotor.

9. A system comprising:
an electric motor to move a mass;
at least one sensor to measure a current and a voltage of the motor; and
a control system to control the motor, the control system includes a processor and a non-transitory computer readable storage medium embodied thereon a program executable by the processor for performing a method of the control, the method comprising:
determining an estimation of a current of the motor using the measured current, the measured voltage, and a model of the motor;
determining a feedback gain as an error function of a feedback signal, wherein the feedback signal includes an error between the measured current and the estimated current;
estimating a speed of the motor using a product of the feedback gain and the feedback signal;

determining a voltage of the motor using a difference between the estimated speed of the motor and a reference speed of the motor; and controlling the motor using the determined voltage, wherein the control system determines the estimated speed of the motor using a sum of a feedback term and a feedforward term, wherein the feedback term includes the product of the feedback gain and the feedback signal, and wherein the feedforward term includes a product of a feedforward gain and a feedforward signal, wherein the feedforward signal includes at least part of a state of the motor.

10. The system of claim 9, wherein the error function increases a value of the feedback gain when a value of an amplitude of the feedback signal increases, and wherein the error function decreases the value of the feedback gain when the value of the amplitude of the feedback signal decreases.

11. The system of claim 9, wherein the error function increases a value of the feedback gain when a value of an amplitude of the feedback signal increases until a first threshold, and wherein the error function decreases the value of the feedback gain when the value of the amplitude of the feedback signal increases above a second threshold, wherein the second threshold is greater or equal the first threshold.

12. The system of claim 9, wherein the control system determines the feedforward gain by reducing a difference between the speed of the motor estimated with the feedforward term and the speed of the motor estimated without the feedforward term.

13. A non-transitory computer readable storage medium embodied thereon a program executable by a processor for performing a method, the method comprising:

determining an estimation of a current of the motor using a measured current, a measured voltage, and a model of the motor;

determining a feedback gain as an error function of a feedback signal, wherein the feedback signal includes an error between the measured current and the estimated current, wherein the error function increases a value of the feedback gain when a value of an amplitude of the feedback signal increases until a first threshold, and wherein the error function decreases the value of the feedback gain when the value of the amplitude of the feedback signal increases above a second threshold, wherein the second threshold is greater or equal the first threshold;

estimating a speed of the motor using a product of the feedback gain and the feedback signal;

determining a voltage of the motor using a difference between the estimated speed of the motor and a reference speed of the motor; and controlling the motor using the determined voltage.

* * * * *